United States Patent
Shimomura

(10) Patent No.: US 11,309,171 B2
(45) Date of Patent: Apr. 19, 2022

(54) ANALYTICAL DEVICE, ANALYTICAL METHOD AND PROGRAM

(71) Applicant: SHIMADZU CORPORATION, Kyoto (JP)

(72) Inventor: Manabu Shimomura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/053,106

(22) PCT Filed: May 7, 2018

(86) PCT No.: PCT/JP2018/017656
§ 371 (c)(1),
(2) Date: Nov. 5, 2020

(87) PCT Pub. No.: WO2019/215792
PCT Pub. Date: Nov. 14, 2019

(65) Prior Publication Data
US 2021/0066057 A1  Mar. 4, 2021

(51) Int. Cl.
*H01J 49/00* (2006.01)
*H01J 49/42* (2006.01)

(52) U.S. Cl.
CPC ...... *H01J 49/0027* (2013.01); *H01J 49/4265* (2013.01); *H01J 49/4295* (2013.01)

(58) Field of Classification Search
CPC ............... H01J 49/0027; H01J 49/0031; H01J 49/0036; H01J 49/42; H01J 49/4265; H01J 49/4295
See application file for complete search history.

(56) References Cited

U.S. PATENT DOCUMENTS

| | | | | |
|---|---|---|---|---|
| 4,008,388 A | * | 2/1977 | McLafferty | H01J 49/0036 702/27 |
| 4,256,404 A | * | 3/1981 | Walker | G01N 21/68 250/205 |
| 6,080,985 A | * | 6/2000 | Welkie | H01J 49/147 250/286 |

(Continued)

FOREIGN PATENT DOCUMENTS

WO   2016/117053 A1   7/2016

OTHER PUBLICATIONS

Written Opinion for PCT/JP2018/017656, dated Jul. 31, 2018.
International Search Report for PCT/JP2018/017656, dated Jul. 31, 2018.

*Primary Examiner* — David E Smith
(74) *Attorney, Agent, or Firm* — Sughrue Mion, PLLC

(57) ABSTRACT

An analytical device, includes: an ionization unit that ionizes carrier gas introduced into the separation column; a mass separation unit that mass-separates ions generated in the ionization unit; a detection unit that detects the ions mass-separated by the mass separation unit in amplification with a predetermined multiplication factor, and outputs a detection signal; an analysis unit that analyzes the detection signal having been output from the detection unit; and an adjustment unit performs an adjustment of the multiplication factor of the detection unit and/or voltage applied to an electrode of an ion transport system of the mass separation unit based on magnitude of the detection signal corresponding to the carrier gas detected by the detection unit.

5 Claims, 5 Drawing Sheets

(56) References Cited

U.S. PATENT DOCUMENTS

2012/0326024 A1* 12/2012 Ruan .................... G01N 27/622
250/282
2018/0012740 A1 1/2018 Shimomura

* cited by examiner

| FLOW RATE (ml/min) | MAGNIFICATION FACTOR FOR CORRECTING |
|---|---|
| 0.5 | 0.4 |
| 1.0 | 1.0 |
| 2.0 | 2.1 |
| 4.0 | 4.5 |

ANALYTICAL DEVICE, ANALYTICAL METHOD AND PROGRAM

CROSS REFERENCE TO RELATED APPLICATIONS

This application is a National Stage of International Application No. PCT/JP2018/017656 filed May 7, 2018.

TECHNICAL FIELD

The present invention relates to an analytical device, an analytical method, and a program.

BACKGROUND ART

In analysis using a gas chromatograph mass spectrometer (hereinafter appropriately referred to as GC-MS), in order to maintain and improve the accuracy and sensitivity of the measurement, adjustment of each unit of the device such as adjusting the voltage applied to the detector is performed.

For example, in adjusting the voltage applied to the detector in the GC-MS, a standard sample such as perfluorotributylamine (hereinafter referred to as PFTBA) is introduced into the ion source of the GC-MS, and adjustment is performed based on the detection intensity obtained by mass spectrometry of this standard sample (see PTL 1).

CITATION LIST

Patent Literature

PTL 1: International publication No. 2016/117053

SUMMARY OF INVENTION

Technical Problem

However, as to a standard sample such as PFTBA there is a problem for example that the amount of PFTBA to be introduced may be subject to changes depending on the room temperature.

Solution to Problem

According to the first aspect of the present invention, an analytical device comprises: an ionization unit that ionizes carrier gas introduced into a separation column; a mass separation unit that mass-separates ions generated in the ionization unit; a detection unit that detects the ions having been mass-separated by the mass separation unit in amplification with a predetermined multiplication factor, and outputs a detection signal; an analysis unit that analyzes the detection signal having been output from the detection unit; and an adjustment unit that performs an adjustment of the multiplication factor of the detection unit and/or voltage applied to an electrode of an ion transport system of the mass separation unit based on magnitude of the detection signal corresponding to the carrier gas detected by the detection unit.

According to the second aspect of the present invention, in the analytical device according to the first aspect, it is preferred that the adjustment unit performs the adjustment based on the magnitude of the detection signal corresponding to the carrier gas detected by the detection unit when the carrier gas with a set flow rate is introduced into the separation column.

According to the third aspect of the present invention, in the analytical device according to the first aspect, it is preferred that the analytical device further comprises a flow rate measurement unit that measures the flow rate of the carrier gas, and wherein: the adjustment unit performs the adjustment based on the flow rate of the carrier gas having been measured and the magnitude of the detection signal corresponding to the carrier gas detected by the detection unit.

According to the fourth aspect of the present invention, in the analytical device according to any one of the first through third aspects, it is preferred that the ion transport system is at least one selected from the group consisting of a lens electrode, an ion guide, and a quadrupole mass filter.

According to the fifth aspect of the present invention, an analytical method, comprises: performing of an ionization of carrier gas introduced into a separation column; performing of a mass-separation of ions generated by ionization; performing of a detection of the ions having been mass-separated by amplification with a predetermined multiplication factor, and of an output of a detection signal by a detection unit; performing of an analysis of the detection signal having been output; and performing of an adjustment of the multiplication factor of the detection unit, and/or of a voltage applied to an electrode of an ion transport system on magnitude of the detection signal corresponding to the carrier gas detected by the detection unit.

According to the sixth aspect of the present invention, in the analytical method according to the fifth aspect, it is preferred that the adjustment is performed based on the magnitude of the detection signal corresponding to the carrier gas detected by the detection unit when the carrier gas with a set flow rate is introduced into the separation column.

According to the seventh aspect of the present invention, in the analytical method according to the fifth aspect, it is preferred that the analytical method further comprises: performing of a measurement of a flow rate of the carrier gas, wherein: the adjustment is performed based on the flow rate of the carrier gas having been measured and the magnitude of the detection signal corresponding to the carrier gas detected by the detection unit.

According to the eighth aspect of the present invention, in the analytical device according to any one of the fifth through seventh aspects, it is preferred that the ion transport system is at least one selected from the group consisting of a lens electrode, an ion guide, and a quadrupole mass filter.

According to the ninth aspect of the present invention, a program for a processing device performing of: an ionization of carrier gas introduced into a separation column; a mass-separation of ions generated by ionization; a detection of the ions having been mass-separated by a detection unit in amplification with a predetermined multiplication factor; an output of a detection signal by the detection unit; and an analysis of the detection signal having been output, wherein: the program causes the processing device to perform an adjustment of the multiplication factor of the detection unit and/or of a voltage applied in the mass-separating to an electrode of an ion transport system based on magnitude of the detection signal corresponding to the carrier gas detected by the detection unit.

Advantageous Effects of Invention

According to the present invention, it is possible to adjust a mass spectrometer without necessarily introducing a standard sample such as PFTBA in an analytical device that perform an analysis using a carrier gas.

DESCRIPTION OF EMBODIMENTS

Hereinafter, embodiments for carrying out the present invention will be described with reference to the drawings. In the analytical device of the following embodiment, adjustment of each unit constituting a mass spectrometer such as an adjustment of the multiplication factor of the detection unit is made based on the magnitude of the detection signal of the detection unit when a carrier gas with a predetermined flow rate is introduced into the separation column.

Overall Configuration

Figure 1:
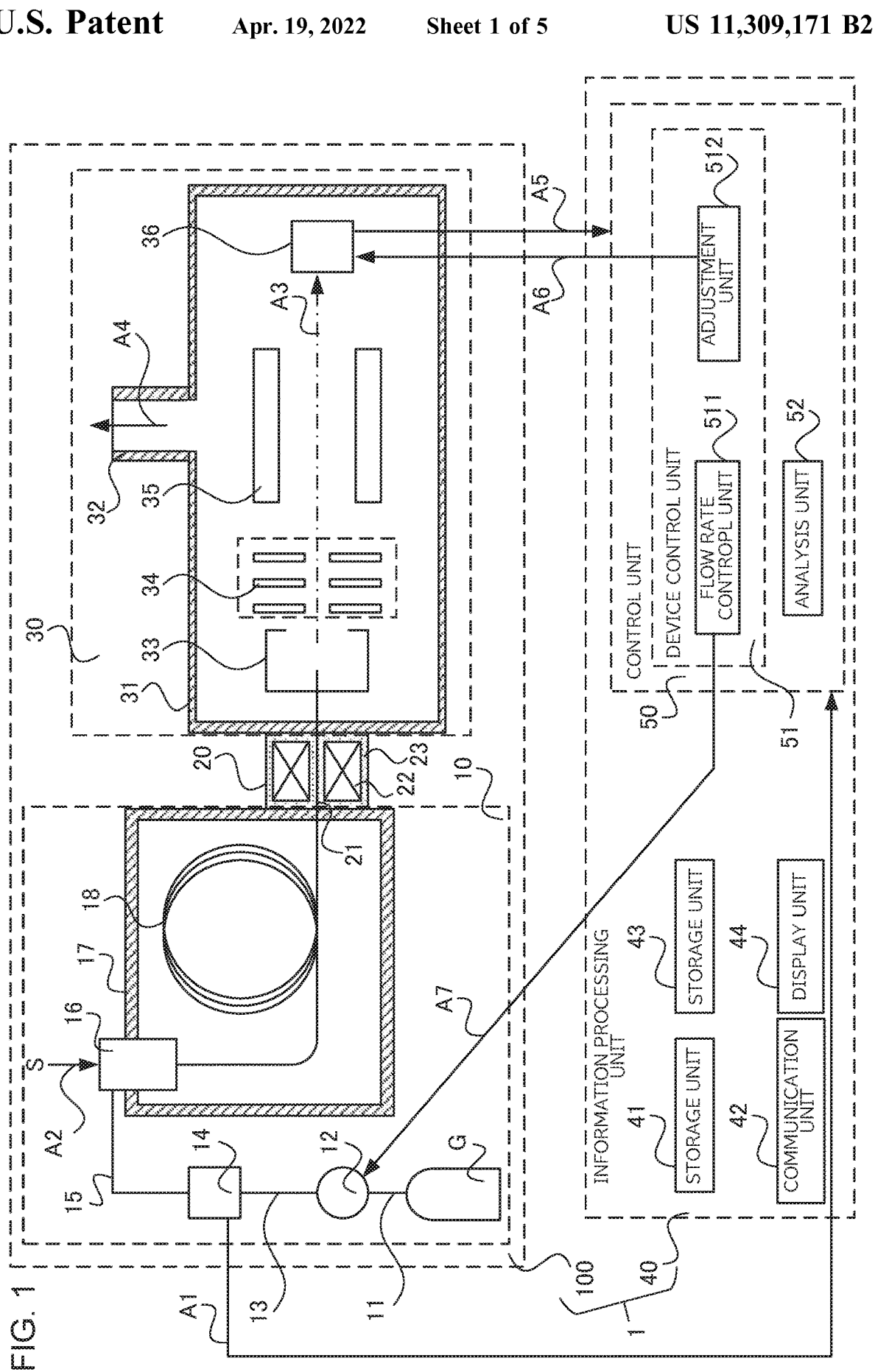
FIG. 1 is a schematic diagram showing the configuration of an analytical device according to one embodiment.

FIG. 1 is a schematic diagram showing the configuration of an analytical device according to the present embodiment. The analytical device 1 is a gas chromatograph mass spectrometer (GC-MS), and is provided with a separation unit 10, a connection unit 20, a mass spectrometry unit 30, and an information processing unit 40.

The separation unit 10 is provided with a gas storage container G in which a carrier gas is stored, a first carrier gas passage 11, a flow rate adjustment unit 12, a second carrier gas passage 13, a sensor 14, a third carrier gas passage 15, a sample introduction unit 16 into which the sample S is introduced, a column temperature adjustment unit 17, and a separation column 18 are provided.

The connection unit 20 is provided with a connection flow passage 21, a heater 22, and a heater supporting unit 23.

The mass spectrometry unit 30 is provided with a vacuum container 31, an evacuate port 32, an ionization unit 33, an ion adjustment unit 34, a mass separation unit 35, and a detection unit 36. By the ion adjustment unit 34 and the mass separating unit 35, an ion transport system is constituted.

The information processing unit 40 is provided with an input unit 41, a communication unit 42, a storage unit 43, a display unit 44, and a control unit 50. The control unit 50 is provided with a device control unit 51 and an analysis unit 52. The device control unit 51 is provided with a flow rate control unit 511 and an adjustment unit 512.

Separation Unit 10

The separation unit 10 is provided with a separation/analysis device such as a gas chromatograph that separates a sample using a carrier gas, and the separation unit 10 separates components contained in the sample S based on physical and/or chemical characteristics. Hereinafter, the separation unit 10 will be described as a gas chromatograph. The sample S to be introduced into the separation column 18 is gas state, and the sample in gas state is referred to a sample gas.

The gas storage container G of the separation unit 10 stores the carrier gas and is connected to the first carrier gas passage 11. The type of carrier gas is not particularly limited as long as it can be ionized by the ionization unit 33 of the mass spectrometry unit 30 and can be detected by the detection unit 36, but helium is preferable from the viewpoint of safety and linear velocity. The carrier gas introduced from the gas storage container G into the first carrier gas passage 11 is introduced into the flow rate adjustment unit 12.

The flow rate adjustment unit 12 of the separation unit 10 is provided with a regulator such as a pressure regulator or a flow rate control valve, and the first carrier gas passage 11 and the second carrier gas passage 13 are connected to the separation unit 10. The flow rate adjustment unit 12 adjusts the flow rate of the carrier gas introduced into the separation column 18 via the sample introduction unit 16 and the separation column 18. The carrier gas introduced into the second carrier gas passage 13 from the flow rate adjustment unit 12 is then introduced to a sensor 14.

The sensor 14 of the separation unit 10 functions as a flow rate measurement unit that directly or indirectly measures the flow rate. The sensor 14 is provided with a pressure sensor and/or a flow rate sensor and measures the pressure and/or the flow rate of the passing carrier gas. The second carrier gas passage 13 and the third carrier gas passage 15 are connected to the sensor 14. The sensor 14 outputs a signal indicating the measured pressure and/or flow rate of the carrier gas to the control unit 50 of the information processing unit 40 (arrow A1). The carrier gas introduced from the sensor 14 into the third carrier gas passage 15 is introduced into the sample introduction unit 16.

It is to be noted that, the flow rate adjustment unit 12 and the sensor 14 may be integrally configured.

The sample introduction unit 16 of the separation unit 10 includes a chamber for introducing a sample in a sample vaporization chamber or the like, and temporarily stores the sample S injected by an injector such as a syringe or an autosampler (not shown). In case that the sample S is liquid, the sample introduction unit 16 vaporizes the sample S to make sample gas and introduces into the separation column 18. As described below, the method of introducing the sample S is not particularly limited as long as the flow rate of the carrier gas flowing to the separation column 18 can be controlled when detecting the carrier gas. A split introduction method, a splitless introduction method, or the like may be used as appropriate.

The separation column 18 of the separation unit 10 is provided with a column such as a capillary column. The temperature of the separation column 18 is controlled to, for example, several hundreds of degrees Celsius or less by a column temperature adjustment unit 17 provided with a column oven or the like. Each component of the sample gas is separated based on for example the distribution coefficient between the mobile phase containing the carrier gas and the stationary phase of the separation column 18. Each separated component of the sample gas respectively flows out at different timing from the separation column 18 and is introduced into the connection unit 20. In the following embodiment, an elapsed time, from the timing according to the start of analysis such as the timing when the sample S is injected into the sample introduction unit 16 to the timing when a specific component of the sample S is detected, is defined as the retention time of this component.

Connection Unit 20

The connection unit 20 is a part that connects the separation part 10 and the mass spectrometry unit 30 and supplies the gas flowing out from the separation column 18 of the separation unit 10 to the ionization unit 33 of the mass spectrometry unit 30. In case the separation column 18 is a capillary column, the connection unit 20 preferably connects the separation unit 10 and the mass spectrometry unit 30 by a direct coupling method.

The temperature of the connection flow passage 21 of the connection unit 20 is adjusted by a heater supported by a heater supporting unit 23 including a heater block and the like. The gas flowing out from the separation column 18 is introduced into the ionization unit 33 after passing through the connection flow passage 21.

Mass Spectrometry Unit 30

The mass spectrometry unit 30 is provided with a mass spectrometer and ionizes the gas and gaseous molecules introduced into the ionization unit 33, and detects a specific component of the sample S by performing mass separation. The path of the ions generated in the ionization unit 33 is schematically shown by an arrow A3.

It is to be noted that hereinafter explanation is made using the single quadrupole mass spectrometer for example which performs mass separation by one quadrupole mass filter as a mass spectrometer. However, if the sample S and the carrier gas introduced from the separation unit 10 can be ionized while maintaining a desired analysis condition such as the degree of vacuum, the type of mass spectrometer that constitutes the mass spectrometry unit 30 is not particularly limited. For example, a magnetic field type, ion trap type, time-of-flight type mass spectrometer or tandem mass spectrometer can be used.

A vacuum container 31 of the mass spectrometry unit 30 is provided with an evacuate port 32. The evacuate port 32 is connected to a vacuum evacuate system (not shown) including a pump such as a turbo molecular pump capable of realizing high vacuum of $10^{-2}$ Pa or less and its auxiliary pump. In FIG. 1, the point at which the gas inside the vacuum container 31 is evacuated is schematically shown by an arrow A4.

The ionization unit 33 of the mass spectrometry unit 30 is provided with an ion source and ionizes the sample S and the carrier gas introduced into the ionization unit 33. In case that the ionization unit 33 is of the type that ionization is conducted by electron ionization, the ionization unit 33 is provided with an ionization chamber, a filament for generating thermoelectron, a trap electrode, and the like, which are not shown. In the ionization unit 33, the thermoelectrons generated by the filament for generating thermoelectron are accelerated at a voltage of several tens of eV applied to the trap electrode to irradiate the molecules in the ionization chamber to generate ions. The ions generated by the ionization unit 33 are introduced into the ion adjustment unit 34.

It is to be noted that, the ionization method is not particularly limited, and for example, a chemical ionization method may be used.

The ion adjustment unit 34 of the mass spectrometry unit 30 is provided with a lens electrode, an ion guide, and the like, and performs adjustment such that converging the ions, for example, by an electromagnetic action on the ions by a voltage applied to the lens electrode and/or the ion guide. The ions emitted from the ion adjustment unit 34 are introduced into the mass separation unit 35.

The mass separation unit 35 of the mass spectrometry unit 30 is provided with a quadrupole mass filter and performs mass separation of the introduced ions. The mass separation unit 35 selectively allows ions to pass according to the value of m/z by the voltage applied to the quadrupole mass filter. The ions subjected to mass separation by the mass separation unit 35 enter the detection unit 36.

The detection unit 36 of the mass spectrometry unit 30 is provided with an ion detector such as an electron multiplier in which a conversion dynode is installed, and detects incident ions. As the electron multiplier, a secondary electron multiplier, a photomultiplier tube or the like is used. The detection unit 36 A/D-converts the detection signal having been obtained in amplification with a set multiplication factor after the ions to be detected are incident and collides thereto, by an A/D converter (not shown), and outputs the digitized detection signal as the measurement data to the control unit 50 of the information processing unit 40 (arrow A5).

The magnitude of the detection signal generated by the ions incident on the electron multiplier such as the secondary electron multiplier or the photomultiplier depends on the multiplication factor determined by the voltage applied to each electron multiplier to accelerate the secondary electrons therein. If this multiplication factor is too large, the detection signal becomes too large and saturated, and accurate measurement data cannot be obtained. On the contrary, if the multiplication factor is too small, at least a part of the components of the sample S cannot be detected, or the detection signal is too small to deteriorate the S/N ratio. As will be described later, the multiplication factor in the detection unit 36 is adjusted by the adjustment unit 512 of the information processing unit 40 and set to an appropriate value (arrow A6).

Information Processing Unit 40

The information processing unit 40 includes an information processing device such as an electronic computer, performs to be an interface with a user, and performs various processing such as communication, storage, and calculation of the various data.

It is to be noted that, the information processing unit 40 may be configured as one device integrated with a measurement unit 100. Further, a part of or all of the data to be used by the analytical device 1 may be stored in a remote server or the like, and a part of or all of the arithmetic processing to be performed by the analytical device 1 may be performed by the remote server or the like.

The input unit 41 is configured to include input devices such as a mouse, a keyboard, various buttons and/or a touch panel, for example. The input unit 41 receives, from the user, information necessary for controlling the operation of the measurement unit 100, such as the type of carrier gas, and information necessary for the processing performed by the control unit 50.

The communication unit 42 is configured to include a communication device capable of communicating by wireless or wired connection to an internet or the like. The communication unit 42 transmits data or the like, obtained by analysis, such as mass spectrum indicating the relationship between the m/z created by the analysis unit 52 and the magnitude of the detection signal for the ion of the m/z, and receives necessary data in appropriate.

The storage unit 43 is composed of a non-volatile storage medium, and stores therein parameters for the adjustment unit 512 to adjust the detection unit 36 and the like, measurement data based on a detection signal from the detection unit 36, a program for the control unit 50 to execute processing, the data such as the mass spectrum created by the analysis unit 52 obtained by analysis, and the like.

The display unit 44 is configured to include a display device such as a liquid crystal monitor, and displays on the display device analysis conditions, measurement data based on a detection signal from the detection unit 36, data obtained by analysis such as the mass spectrum created by the analysis unit 52, and the like.

Control Unit 50

The control unit 50 includes a processor such as a CPU, controls the operation of each unit of the measurement unit 100, and processes the detection signal having been output from the detection unit 36 as measurement data. It is to be noted that the processor also includes an FPGA.

Device Control Unit 51

The device control unit 51 of the control unit 50 controls the operation of each unit of the measurement unit 100.

Flow Rate Control Unit 511

The flow rate control unit 511 of the device control unit 51 controls the flow rate adjustment unit 12 based on the pressure and/or the flow rate of the carrier gas having been output from the sensor 14 to adjust the flow rate of the carrier gas (arrow A7). The flow rate control unit 511 acquires the value of the flow rate of the carrier gas to set at an adjustment of the voltage of the detection unit 36. The value of this flow rate is stored in advance in the storage unit 43 and is, for example, 1.0 ml/min, but is not particularly limited. The flow rate control unit 511 compares the flow rate having been output from the sensor 14 or the flow rate calculated from the pressure having been output from the sensor 14 (hereinafter, these flow rates are appropriately referred to as the measured flow rate) with the flow rate of the carrier gas that was set, and control the flow rate adjustment unit 12 so that the flow rate of the carrier gas approaches the set value.

Adjustment Unit 512

The adjustment unit 512 of the device control unit 51 adjusts the multiplication factor of the detection unit 36 based on the set flow rate of the carrier gas. The adjustment unit 512 acquires the type of carrier gas obtained by the input or the like of the input unit 41. The storage unit 43 stores therein the target value, for the voltage adjustment, of the magnitude of the detection signal of the ion corresponding to the carrier gas. This target value is in correspondence with the value of the flow rate of the carrier gas to be set for the voltage adjustment of the detection unit 36. Here, the target value is not particularly limited and the detection intensity in the selected ion monitoring (Selected Ion Monitoring: SIM), and the peak intensity, the peak area, and the like on mass spectrum of the ion of m/z corresponding to the predetermined carrier gas may also be used as long as this target value is indicative of the magnitude of the detection signal of the ion corresponding to the predetermined carrier gas. The adjustment unit 512 controls the voltage applied to the detection unit 36 so that the magnitude of the detection signal of the ion of m/z corresponding to the carrier gas from the detection unit 36 approaches this target value, and sets the multiplication factor. When the magnitude of the detection signal of the carrier gas becomes to be within a predetermined numerical range such as 90% to 110% of the target value for a predetermined time such as several seconds to several minutes, it is preferred that the adjustment unit 512 completes setting the multiplication factor.

For example, in case the carrier gas is helium, the adjustment unit 512 controls the applied voltage to the detection unit 36 so that the detection intensity of ionized helium obtained by the SIM approaches the target value. In the SIM, the change over time in the amount of ions having a particular m/z is detected. Alternatively, the adjustment unit 512 may adjust the applied voltage to the detection unit 36 so that the peak area corresponding to ionized helium in the mass spectrum which is obtained by scanning m/z as in a total ion monitoring (Total Ion Monitoring: TIM) or the like, approaches the target value.

Analysis Unit 52

The analysis unit 52 of the control unit 50 processes and analyzes the detection signal from the detection unit 36 as measurement data. The analysis unit 52 calculates the detection intensity of the ion while corresponding the m/z of the ions of the sample S and the carrier gas, which are mass-separated by the mass separation unit 35, with the intensity of the detection signal. Further, the analysis unit 52 constructs data in which the intensity of the detection signal and m/z are associated with each other as data corresponding to the mass spectrum, and stores therein the data in the storage unit 43.

The analysis unit 52 calculates the peak intensity of each peak and/or the area corresponding to each peak of the mass spectrum as necessary, and calculates the magnitude of the detection signal of the component corresponding to each peak.

In addition, in the analysis of the sample S, the analysis unit 52 identifies the component corresponding to the peak of the mass spectrum by corresponding the obtained measurement data with the past data, and/or quantifies the target component from the detection intensity obtained by SIM. The analysis unit 52 generates a display image that indicates the data of the constructed mass spectrum and the information obtained by the analysis, and causes the display unit 44 to display the display image.

Steps of Analytical Method

Figure 2:
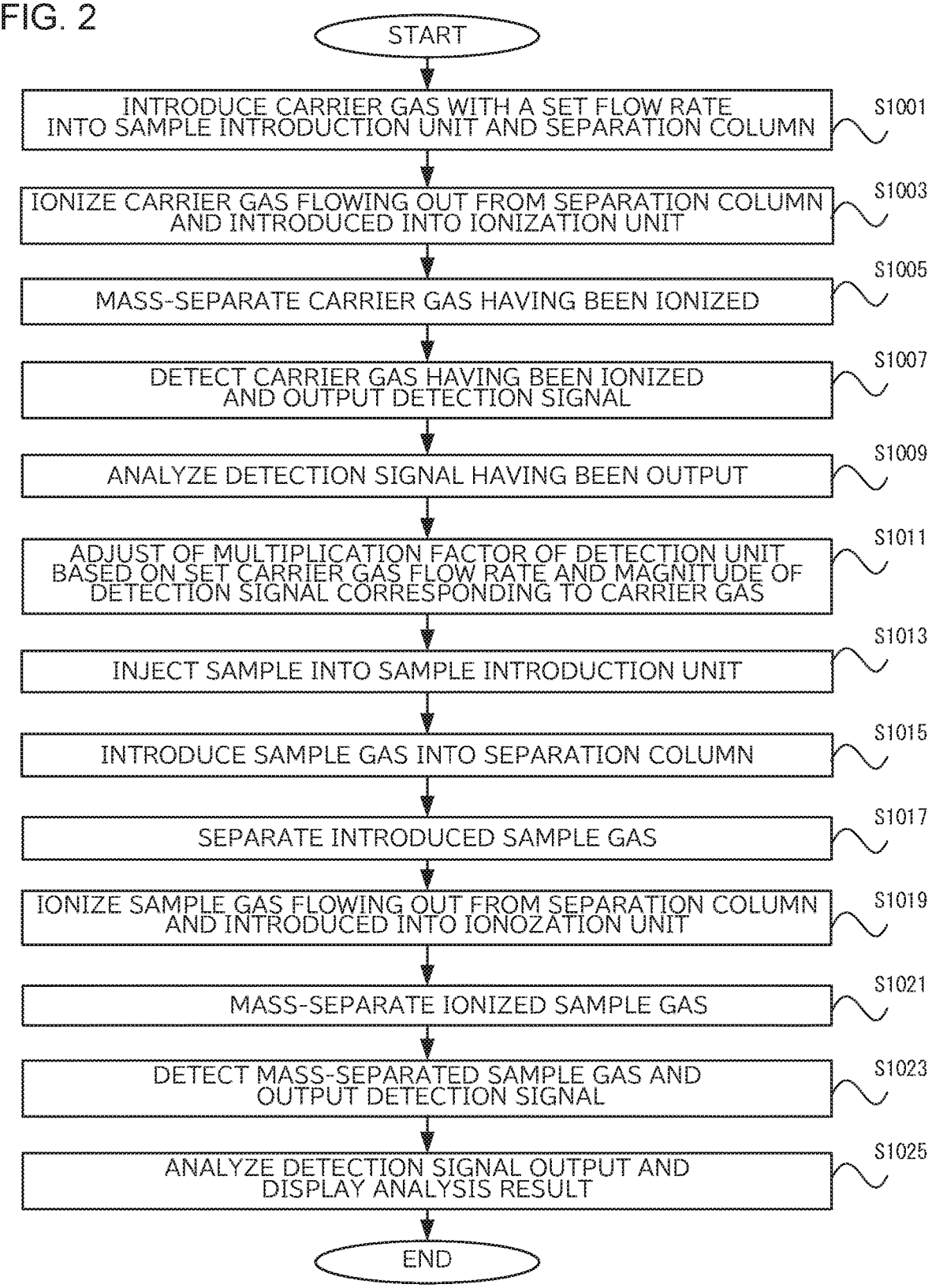
FIG. 2 is a flowchart showing the flow of the analytical method according to one embodiment.

FIG. 2 is a flowchart showing the flow of the analysis method according to the present embodiment. In step S1001, the flow rate adjustment unit 12 introduces the carrier gas with a set flow rate into the sample introduction unit 16 and the separation column 18. Upon ending step S1001, step S1003 starts. In step S1003, the ionization unit 33 ionizes the carrier gas flowing out from the separation column 18 and introduced into the ionization unit. Upon ending step S1003, step S1005 starts.

In step S1005, the mass separation unit 35 mass-separates the ionized carrier gas. Upon ending step S1005, step S1007 starts. In step S1007, the detection unit 36 detects the mass-separated carrier gas and outputs a detection signal thereof to the control unit 50. Upon ending step S1007, step S1009 starts.

In step S1009, the analysis unit 52 analyzes the detection signal having been output and calculates the magnitude of the detection signal corresponding to the carrier gas. Upon ending S1009, step S1011 starts. In step S1011, the adjustment unit 512 adjusts of the multiplication factor of the detection unit 36 based on the set carrier gas flow rate and the magnitude of the detection signal corresponding to the carrier gas. Upon ending step S1011, step S1013 starts.

In step S1013, the sample S is injected into the sample introduction unit 16 by a syringe, an auto sampler, or the like. Upon ending step S1013, step S1015 starts. In step S1015, the sample introduction unit 16 introduces the sample gas into the separation column 18. Upon ending step S1015, step S1017 starts.

In step S1017, the separation column 18 separates the introduced sample gas. Upon ending step S1017, step S1019 starts. In step S1019, the ionization unit 33 ionizes the sample gas flowing out from the separation column 18 and introduced into the ionization unit 33. Upon ending step S1019, step S1021 starts.

In step S1021, the mass separation unit 35 mass-separates the ionized sample gas. Upon ending step S1021, step S1023 starts. In step S1023, the detection unit 36 detects the mass-separated sample gas and outputs the detection signal. Upon ending step S1023, step S1025 starts.

In step S1025, the analysis unit 52 analyzes the detection signal output from the detection unit 36 in step S1023, and the display unit 44 displays the analysis result. Upon ending step S1025, the process ends.

According to the above-mentioned embodiment, the following advantageous effects can be obtained.

(1) In each of the analytical device and the analytical method according to the present embodiment, the ionization unit 33 ionizes carrier gas introduced into the separation column 18; the mass separation unit 35 mass-separates ions generated in the ionization unit 33; the detection unit 36 detects the ions mass-separated by the mass separation unit 35 in amplification with a predetermined multiplication factor, and outputs a detection signal; the analysis unit 52 analyzes the detection signal output from the detection unit 36; and the adjustment unit 512 performs the adjustment based on the magnitude of the detection signal corresponding to the carrier gas detected by the detection unit 36 when the carrier gas with a predetermined flow rate is introduced into the separation column 18. Thereby, the mass spectrometer can be adjusted without necessarily introducing the standard sample such as PFTBA. Further, in the conventional adjustment of the detector using the standard sample, because the volatilization amount of the standard sample such as PFTBA varies depending on the temperature, and the introduced amount of the standard sample introduced into the ion source deviates, so it should be necessary to cope with the change in room temperature. On the contrary, in the analytical device 1 according to the present embodiment does not need to do so.

(2) In each of the analytical device and the analytical method according to the present embodiment, the adjustment unit 512 performs the adjustment of the multiplication factor of the detection unit 36 based on magnitude of the detection signal corresponding to the carrier gas detected by the detection unit 36 when the carrier gas with a set flow rate is introduced into the separation column 18. Thereby, the multiplication factor can be appropriately adjusted based on data obtained in the past measurement and the like.

The following variations are also within the scope of the present invention, and can also be combined with the above-described embodiment. In the following variation, the portions having the same structure and function as those of the above-described embodiment are referred to by the same reference signs, and the description thereof will be appropriately omitted.

Variation 1

In the above embodiment, the multiplication factor of the detection unit 36 is adjusted based on the set flow rate of the carrier gas, but the multiplication factor of the detection unit 36 may be adjusted based on the measured flow rate of the carrier gas.

The adjustment unit 512 of the present variation calculates a target value of the magnitude of the detection signal corresponding to the measured carrier gas flow rate based on the corresponding data obtained from the correspondence table stored in advance in the storage unit 43 using the carrier gas flow rate measured by the sensor 14.

Figure 3:
FIG. 3 is a diagram showing a correspondence table of carrier gas flow rates and detector multiplication factors.

FIG. 3 is a diagram showing a correspondence table T to which the adjustment unit 512 refers. The correspondence table T shows the flow rate of the carrier gas and the magnification for correcting the target value of the magnitude of the detection signal of the carrier gas, which corresponds to the flow rate of the carrier gas. The adjustment unit 512 multiplies the target value of the magnitude of the detection signal corresponding to the carrier gas at the reference flow rate (1 ml/min) by the multiplication factor to calculate the desired flow rate at any flow rate shown in the correspondence table T. For flow rates not listed in the correspondence table T, values obtained by approximating the values shown in the correspondence table T with a straight line or the like and interpolating or extrapolating the values can be used as appropriate.

For example, when the measured value of the carrier gas flow rate by the sensor 14 is 0.5 ml/min, the adjustment unit 512 refers to the data corresponding to the correspondence table T, and obtain the magnification 0.4 for correction corresponding to 0.5 ml/min. In addition to the correspondence table T, the storage unit 43 stores therein the target value at the reference flow rate of 1.0 ml/min. The adjustment unit 512 multiplies the target value at the reference flow rate by 0.4 and sets 0.4 ml/min as the target value of the magnitude of the carrier gas detection signal. The adjustment unit 512 controls the voltage applied to the detection unit 36 so as to approach the set target value.

Figure 4:
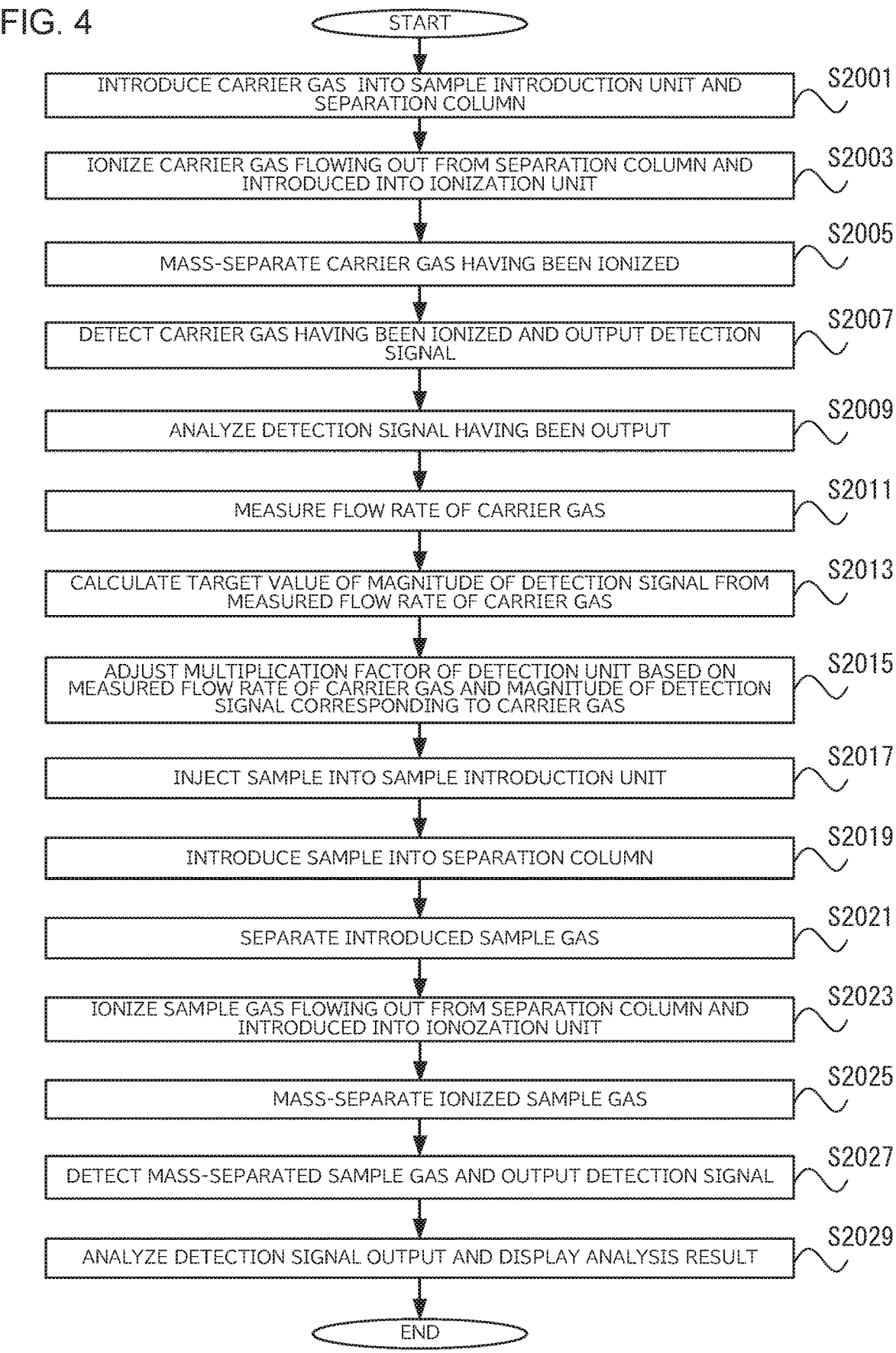
FIG. 4 is a flowchart showing the flow of the analytical method of a variation.

FIG. 4 is a flowchart showing the flow of the analytical method of the present variation. Since steps S2001 to S2009 are the same as steps S1001 to 1009 in the above-described embodiment, description thereof will be omitted. Upon ending step S2009, step S2011 starts. In step S2011, the sensor 14 measures of the flow rate of the carrier gas. Upon ending step S2011, step S2013 starts. In step S2013, the adjustment unit 512 refers to the correspondence table T and calculates the target value of the magnitude of the detection signal corresponding to the carrier gas from the measured flow rate of the carrier gas. Upon ending step S2013, step S2015 starts. In step S2015, the adjustment unit 512 adjusts the multiplication factor of the detection unit 36 based on the measured flow rate of the carrier gas and the magnitude of the detection signal corresponding to the carrier gas. Upon ending step S2015, step S2017 starts. Since steps S2017 to S2029 are the same as steps S1013 to S1025, description thereof will be omitted.

The analytical device 1 according to the present variation includes the sensor 14 that is a flow rate measurement unit that measures the flow rate of the carrier gas, and the adjustment unit 512 adjusts the multiplication factor of the detection unit 36 based on the flow rate of the measured carrier gas and the magnitude of detection signal corresponding to the carrier gas detected by the detection unit 36. Thereby, the multiplication factor of the detection unit 36 can be adjusted with higher accuracy based on the actually measured flow rate of the carrier gas.

In the analytical device 1 according to the present variation, the adjustment unit 512 calculates the target value of the magnitude of the detection signal corresponding to the measured flow rate of the carrier gas based on the data of the correspondence table T obtained in advance. Thereby, the multiplication factor of the detection unit 36 can be appropriately set for various values of the measured flow rate of the carrier gas.

Variation 2

In the above-described embodiment, the adjustment unit 512 sets the voltage applied to the detection unit 36 to adjust the magnification factor. However, the voltage applied to the ion adjustment unit 34 and/or the mass separation unit 35 may be set. For example, the adjustment unit 512 can adjust the voltage applied to the lens electrode of the ion adjustment unit 34 so that the detection intensity of the carrier gas becomes the highest. Thereby, the detection sensitivity when analyzing the sample S can be increased. The adjustment unit 512 adjusts the voltage applied to the electrode in the ion transport system selected from at least one of the group consisting of the lens electrode, the ion guide, and the quadrupole mass filter, based on the magnitude of the carrier gas detection signal to adjust the detection sensitivity when analyzing the sample S.

In the analytical device 1 and the analytical method according to the present variation, the adjustment unit 512 controls voltage, which is applied to the ion transport system such as the lens electrode, the ion guide, the quadrupole mass filter, and the like, based on the magnitude of the detection signal corresponding to the carrier gas detected by the detection unit 36 when the carrier gas with a predetermined flow rate is introduced into the separation column 18. Thereby, without the standard sample, it is possible that various parameters of the ion transport system of the mass spectrometer can be appropriately adjusted to adjust the detection sensitivity and the like.

Variation 3

It is available that a program for realizing the information processing function of the analyzer 1, that is, a program to control of measurement processing including adjustment by the adjustment unit 512, analysis processing, and display processing described above and processing related thereto is recorded in a computer-readable recording medium and then the program is read and executed by a computer system. It is noted that the term "computer system" in this context may refer to an OS (operating system) or a peripheral device in hardware. In addition, the "computer-readable recording medium" may be a portable recording medium such as a flexible disk, a magneto-optical disk, an optical disk or a memory card, or it may be a storage device such as a hard disk built into the computer system. Furthermore, the "computer-readable recording medium" may be a medium that dynamically holds the program over a short period of time, e.g., a communication line through which the program is transmitted via a network such as the Internet or via a communication network such as a telephone network, or a medium that holds the program over a certain length of time, e.g., a volatile memory within a computer system functioning as a server or a client in the above case. Moreover, the program may allow only some of the functions described above to be fulfilled or the functions described above may be fulfilled by using the program in conjunction with a program pre-installed in the computer system.

Figure 5:
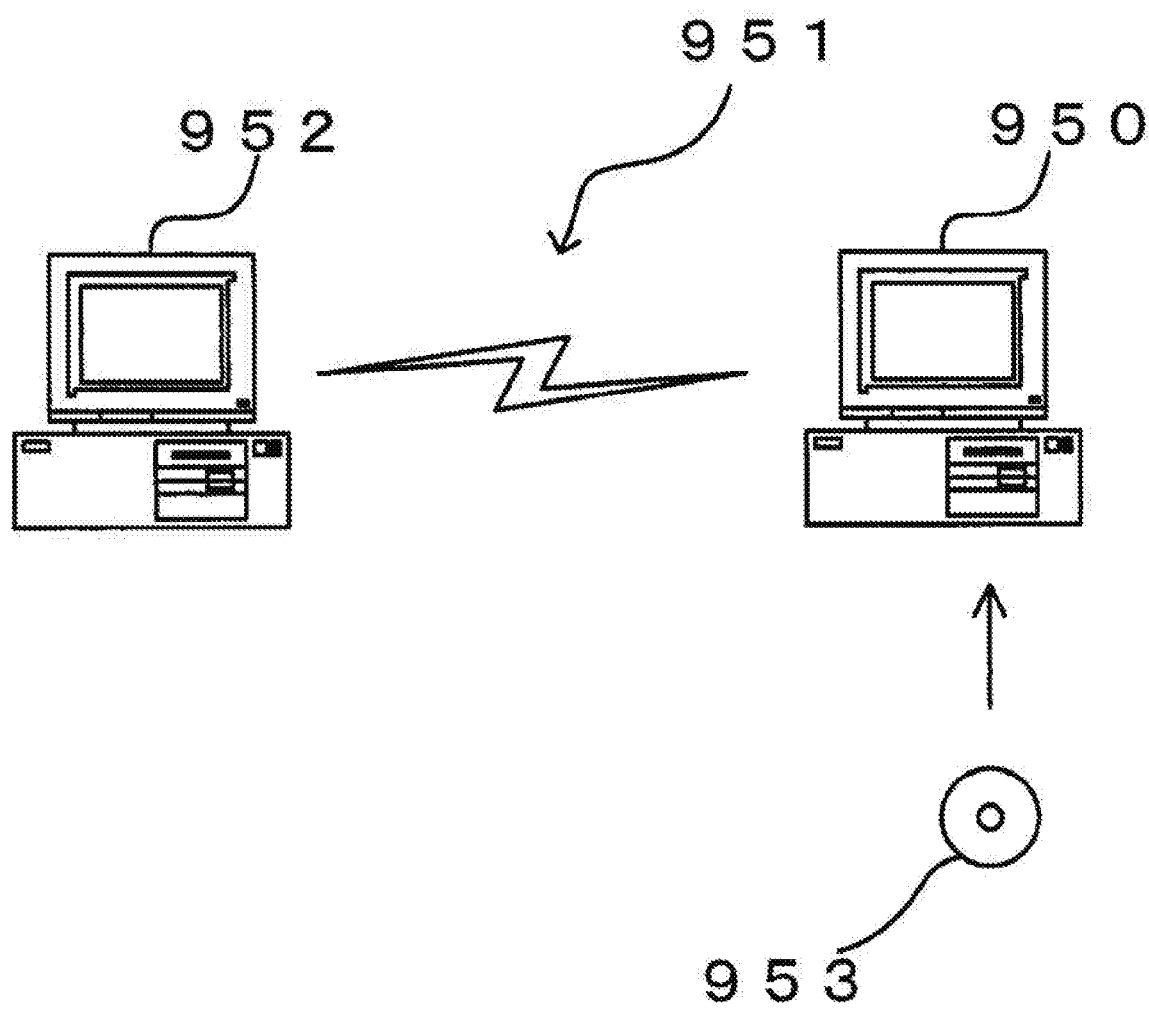
FIG. 5 is a conceptual diagram for explaining the program.

In addition, the present invention may be adopted in conjunction with a personal computer (hereafter referred to as a PC) or the like, and in such a case, the program pertaining to the control described above can be provided in a recording medium such as a CD-ROM or a data signal transmitted through the Internet or the like. FIG. 5 illustrates how such a program may be provided. A PC 950 receives the program via a CD-ROM 953. The PC 950 is also capable of connecting with a communication network 951. A computer 952 is a server computer that provides the program stored in a recording medium such as a hard disk. The communication network 951 may be a communication network such as the Internet or a personal computer communication network, or it may be a dedicated communication network. The computer 952 reads out the program from the hard disk and transmits it to the PC 950 via the communication network 951. In other words, the program may be delivered as a data signal carried on a carrier wave transmitted via the communication network 951. Namely, the program can be distributed as a computer-readable computer program product assuming any of various modes including a recording medium and a carrier wave.

As the program for realizing the above-described information processing function, it is included a program causes a processing device of an analytical device 1 to perform: an ionization of carrier gas and the sample S having been separated by the separation column 18; a mass-separation of ions generated by ionization; a detection of the ions having been mass-separated in amplification with a predetermined multiplication factor, and an output of a detection signal by a detection unit 36; and an analysis of the detection signal having been output, wherein: the program causes the processing device to perform an adjustment of the multiplication factor of the detection unit and/or voltage applied to an electrode of an ion transport system based on magnitude of the detection signal corresponding to the carrier gas detected by the detection unit 36 when the carrier gas with a predetermined flow rate is introduced into the separation column 18. Thereby, the mass spectrometer can be adjusted without necessarily introducing the standard sample such as PFTBA.

The process executed as the program according to the present invention mainly includes step S1009 and step S1011 in FIG. 2, and the process is performed by executing the program by the control unit 50 of FIG. 1, for example. The program is stored in the control unit 50 or stored in the storage unit 43 in advance. Namely, the program according to the present invention is a program used by the processing device of the analytical device 1 performing of: an ionization of carrier gas and the sample S having been separated by the separation column 18; a mass-separation of ions generated by ionization; a detection of the ions having been mass-separated in amplification with a predetermined multiplication factor, and outputting of a detection signal, by a detection unit 36; and an analysis of the detection signal having been output. This program includes a calculation procedure and an adjustment procedure. In the calculation procedure, the detection signal corresponding to the carrier gas detected by the detection device is analyzed and the magnitude thereof is calculated. In the adjustment procedure, based on the magnitude of the detection signal calculated in the calculation procedure, the multiplication factor of the detection device and/or the voltage applied in the mass-separation to the electrode in the ion transport system is appropriately calculated and the detector and/or the applied voltage is adjusted based on the calculated multiplication factor and/or the voltage as appropriate.

The present invention is not limited to the contents of the above embodiment. Other aspects that are conceivable within the scope of the technical idea of the present invention are also included within the scope of the present invention.

REFERENCE SIGNS LIST

1 . . . Analytical Device, 10 . . . Separation Unit, 12 . . . Flow Rate Adjustment Unit, 14 . . . Sensor, 16 . . . Sample Introduction Unit, 18 . . . Separation Column, 20 . . . Connection Unit, 21 . . . Connection Flow Passage, 30 . . . Mass Spectrometry Unit, 33 . . . Ionization Unit, 34 . . . Ion Adjustment Unit, 35 . . . Mass Separation Unit, 36 . . . Detection Unit, 40 . . . Information Processing Unit, 50 . . . Control Unit, 51 . . . Device Control Unit, 52 . . . Analysis Unit, 100 . . . Measurement unit, 511 . . . Flow Rate Control Unit, 512 . . . Adjustment Unit, G . . . Gas Storage Container, S . . . Sample, T . . . Correspondence Table

The invention claimed is:

1. An analytical device, comprising:
    an ionization unit that ionizes carrier gas introduced into a separation column;
    a mass separation unit that mass-separates ions generated in the ionization unit;
    a detection unit that detects the ions having been mass-separated by the mass separation unit in amplification with a predetermined multiplication factor, and outputs a detection signal;
    an analysis unit that analyzes the detection signal having been output from the detection unit;
    a flow rate measurement unit that measures a flow rate of the carrier gas; and
    an adjustment unit that performs an adjustment of the multiplication factor of the detection unit and/or voltage applied to an electrode of an ion transport system of the mass separation unit based on the flow rate of the carrier gas having been measured and magnitude of the detection signal corresponding to the carrier gas detected by the detection unit.

2. The analytical device according to claim 1, wherein:
    the ion transport system is at least one selected from the group consisting of a lens electrode, an ion guide, and a quadrupole mass filter.

3. An analytical method, comprising:
    performing of an ionization of carrier gas introduced into a separation column;
    performing of a mass-separation of ions generated by ionization;
    performing of a detection of the ions having been mass-separated by amplification with a predetermined multiplication factor, and of an output of a detection signal by a detection unit;
    performing of an analysis of the detection signal having been output;
    performing of a measurement of a flow rate of the carrier gas; and
    performing of an adjustment of the multiplication factor of the detection unit, and/or of a voltage applied to an electrode of an ion transport system in the mass-separation based on the flow rate of the carrier gas having been measured and magnitude of the detection signal corresponding to the carrier gas detected by the detection unit.

4. The analytical method according to claim 3, wherein:
    the ion transport system is at least one selected from the group consisting of a lens electrode, an ion guide, and a quadrupole mass filter.

5. A non-transitory computer-readable medium including a program for a processing device of an analytical device, the analytical device performing:
    an ionization of carrier gas introduced into a separation column;
    a mass-separation of ions generated by ionization;
    a detection of the ions having been mass-separated in amplification with a predetermined multiplication factor by a detection unit;
    an output of a detection signal by the detection unit;
    an analysis of the detection signal having been output; and
    a measurement of a flow rate of the carrier gas, wherein:
    the program causes the processing device to perform an adjustment of the multiplication factor of the detection unit and/or of a voltage applied to an electrode of an ion transport system in the mass-separation based on the flow rate of the carrier gas having been measured and magnitude of the detection signal corresponding to the carrier gas detected by the detection unit.

* * * * *